United States Patent
Rubens et al.

(10) Patent No.: US 10,293,419 B2
(45) Date of Patent: May 21, 2019

(54) STRAIGHT CUTTING OSCILLATING BLADE

(71) Applicants: Jeremy Rubens, Palatine, IL (US); Brad Padget, Huntley, IL (US); Robert Bosch GmbH, Stuttgart (DE)

(72) Inventors: Jeremy Rubens, Palatine, IL (US); Brad Padget, Huntley, IL (US)

(73) Assignees: Robert Bosch Tool Corporation, Broadview, IL (US); Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/315,170

(22) PCT Filed: Jun. 17, 2015

(86) PCT No.: PCT/US2015/036194
§ 371 (c)(1),
(2) Date: Nov. 30, 2016

(87) PCT Pub. No.: WO2015/195778
PCT Pub. Date: Dec. 23, 2015

(65) Prior Publication Data
US 2017/0100790 A1      Apr. 13, 2017

Related U.S. Application Data

(60) Provisional application No. 62/013,152, filed on Jun. 17, 2014.

(51) Int. Cl.
*B23D 61/06*      (2006.01)
*B23D 49/11*      (2006.01)
(Continued)

(52) U.S. Cl.
CPC .............. *B23D 49/11* (2013.01); *B23D 49/00* (2013.01); *B23D 49/06* (2013.01); *B23D 61/00* (2013.01);
(Continued)

(58) Field of Classification Search
CPC .. B26B 7/00; B26B 5/00; E04D 15/02; B23D 49/11; B23D 61/006; B23D 49/00; B23D 49/06; B25F 5/006
(Continued)

(56) References Cited

U.S. PATENT DOCUMENTS

| 4,617,930 A | 10/1986 | Saunders |
| 2011/0316241 A1 | 12/2011 | Zhang et al. |

(Continued)

FOREIGN PATENT DOCUMENTS

| DE | 102010014917 A1 | 10/2011 |
| DE | 102010039786 A1 | 3/2012 |

(Continued)

OTHER PUBLICATIONS

International Search Report corresponding to PCT Application No. PCT/US2015/036194 dated Aug. 28, 2015 (3 pages).

(Continued)

*Primary Examiner* — Kenneth E Peterson
*Assistant Examiner* — Nhat Chieu Q Do
(74) *Attorney, Agent, or Firm* — Maginot Moore & Beck LLP

(57) ABSTRACT

An accessory tool for an oscillating power tool includes a blade portion including a first lateral edge portion, a second lateral edge portion, and a leading edge portion, the leading edge portion defining a cutting edge. A reinforcement structure extends linearly across the blade portion from a first position located on the leading edge portion proximate the first lateral edge portion to a second position located on the (Continued)

second lateral edge portion and spaced apart from the leading edge portion. The reinforcement structure defines a cutting zone that encompasses a leading region of the blade portion between the reinforcement structure and the leading edge portion, the reinforcement structure being configured to increase a stiffness of the blade portion.

18 Claims, 4 Drawing Sheets

(51) Int. Cl.
      *B23D 61/00*     (2006.01)
      *B23D 49/00*     (2006.01)
      *B25F 1/02*      (2006.01)
      *B25F 5/00*      (2006.01)
      *B24B 23/00*     (2006.01)
      *B24B 27/08*     (2006.01)
      *B24D 5/12*      (2006.01)
      *B23D 49/06*     (2006.01)

(52) U.S. Cl.
      CPC ............ *B23D 61/006* (2013.01); *B24B 23/00* (2013.01); *B24B 27/08* (2013.01); *B24D 5/12* (2013.01); *B25F 1/02* (2013.01); *B25F 5/00* (2013.01); *B25F 5/006* (2013.01)

(58) Field of Classification Search
      USPC .................................................... 30/353, 356
      See application file for complete search history.

(56) References Cited

U.S. PATENT DOCUMENTS

| | | |
|---|---|---|
| 2012/0041443 A1 | 2/2012 | Landon |
| 2013/0269963 A1 | 10/2013 | Fuchs |
| 2015/0000143 A1* | 1/2015 | Bozic .................. B23D 61/025 30/347 |

FOREIGN PATENT DOCUMENTS

| | | |
|---|---|---|
| EP | 0695607 A1 | 2/1996 |
| EP | 2233085 A1 | 9/2010 |
| TW | 201325779 A | 7/2013 |
| WO | 2013091966 A1 | 6/2013 |

OTHER PUBLICATIONS

Office Action (English language translation) from corresponding CN patent application No. 201580032532.6 dated Jul. 3, 2018 (15 pages).

* cited by examiner

STRAIGHT CUTTING OSCILLATING BLADE

CROSS-REFERENCE TO RELATED APPLICATIONS

This application is a 35 U.S.C. § 371 National Stage Application of PCT/US2015/036194, filed on Jun. 17, 2015, which claims the benefit of priority to U.S. Provisional Application No. 62/013,152, filed on Jun. 17, 2014 and entitled "Straight Cutting Oscillating Blade," the disclosures of which are incorporated herein by reference in their entireties.

TECHNICAL FIELD

This disclosure relates generally to power tools, and, more particularly, to oscillating tools for straight cutting.

BACKGROUND

In general, oscillating tools are light-weight, handheld power tools capable of being equipped with a variety of tool accessories and attachments, such as cutting blades, sanding discs, grinding tools, and many others. These types of tools, referred to hereinafter as power tools, typically include a generally cylindrically-shaped main body that serves as an enclosure for an electric motor as well as a hand grip for the tool. The electric motor is operably coupled to a drive member, referred to herein as a tool mount, that extends from a portion of the main body of the power tool. The electric motor is configured to rotate and/or oscillate the tool mount at relatively high frequencies.

The tool mount in turn is configured to secure different attachments so that as the tool mount is driven to move by the electric motor, an accessory tool secured to the mount is driven to perform work on a workpiece. Attachments usable with an oscillating tool include saw blades, sanders, raspers, grinders, scrapers, cutters, and polishers. Attachments can generally be mounted in a variety of orientations, which enables precision working in otherwise hard to reach areas.

Straight blades including cutting teeth on an end side have been used as saw blade attachments for making plunge cuts, whereby the straight blade descends into a material being cut rather than moving transversely along a straight cut. Typically, oscillating blades used for straight cuts tend to flex during cutting, which can distort an otherwise straight cut, damage the blade, or damage the material being cut. Straight blades have been proposed that have an increased blade thickness to decrease flexing and improve straight cut performance. However, increasing blade thickness increases a mass of the oscillating tool and a vibration caused by the oscillating tool when in use, and can have other detrimental effects. What is needed, therefore, is a straight blade for an oscillating tool optimized for straight cuts.

DRAWINGS

DETAILED DESCRIPTION

For the purposes of promoting an understanding of the principles of the embodiments described herein, reference is now made to the drawings and descriptions in the following written specification. No limitation to the scope of the subject matter is intended by the references. This disclosure also includes any alterations and modifications to the illustrated embodiments and includes further applications of the principles of the described embodiments as would normally occur to one skilled in the art to which this document pertains.

Figure 1:
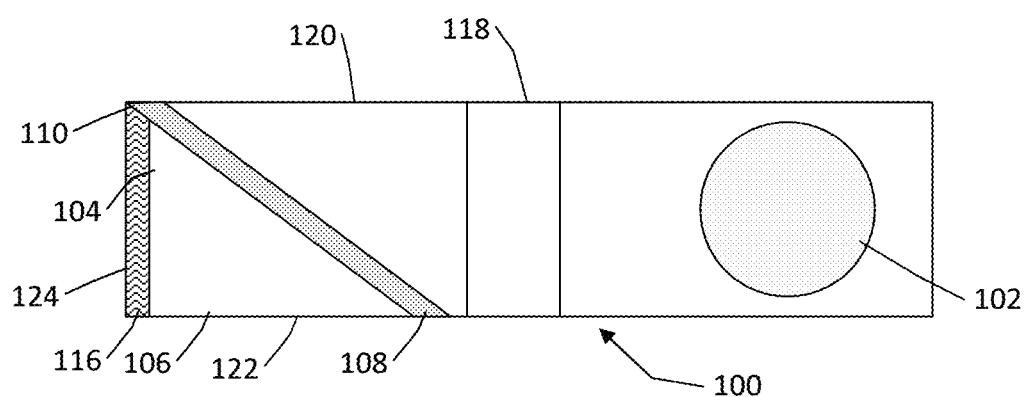
FIG. 1 is a plan view of an exemplary embodiment of a straight cutting oscillating blade.

FIG. 1 depicts a plan view of an embodiment of a straight cutting oscillating blade 100 having an attachment portion 102, and a blade portion 104. The attachment portion 102 can be configured in a known manner to attach the blade 100 to an oscillating tool (FIG. 4) such that the blade 100 can be oscillated by the tool. The blade portion 104 includes lateral edges 120, 122 and a leading edge 124. The lateral edges 120, 122 extend forwardly from the attachment portion 102, and the leading edge 124 extends between the distal ends of the lateral edges 120, 122. The leading edge 124 defines a cutting edge and may include cutting teeth configured to perform an operation on a workpiece, such as a straight cut. The blade 100 may also include a transition portion 118 that offsets the blade portion 104 of the blade from the attachment portion 102.

Figure 2:
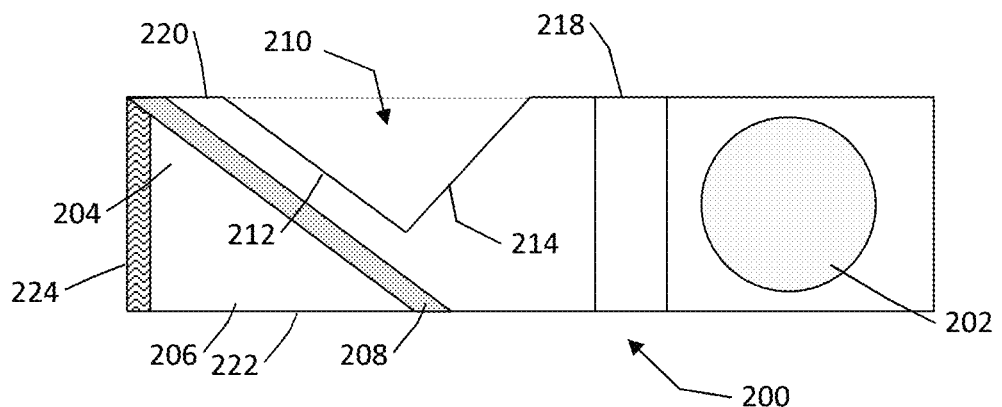
FIG. 2 is a plan view of another exemplary embodiment of a straight cutting oscillating blade.

The blade 100 further includes a reinforcement structure 108 that extends across the blade portion 104 and defines a cutting zone 106 that encompasses the blade portion from the reinforcement structure to a leading edge portion 116. The reinforcement structure is configured to increase a stiffness of the blade 100, without increasing the thickness of the cutting zone 106 or increasing the inertial mass of the blade 100. In the embodiment illustrated in FIG. 1, the cutting zone 106 has a substantially triangular shape, although cutting zones having other shapes are also contemplated. The reinforcement structure 108 extends from a corner 110 of the leading edge 124 and at least substantially across the blade 100 at an angle relative to the leading edge 124. As can be seen in FIG. 2, the reinforcement structure 108 extends to a position on the lateral edge that is proximate the transition portion 118. In some embodiments, the cutting zone 106 is defined at least in part by the reinforcement structure 108.

The reinforcement 108 as illustrated in FIG. 1 may be a separate reinforcement member that has been suitably attached to the blade 100. Alternatively, the reinforcement may be a stamped or formed geometry in the blade 100. The reinforcement 108 may advantageously extend across an entire width of the blade 100, so that the reinforcement 108 may be formed by a uniform stamping operation across the blade 100. The reinforcement 108 is further configured to limit walking or flexing of the blade 100 during straight cutting. Due to inclusion of the reinforcement 108, the cutting zone can be configured with a thinner profile than a conventional blade, resulting in a lower mass and less vibration, and more accurate cutting with less distortion. In an example, the cutting zone 106 has a thickness that is 25% thinner or more, relative to a conventional straight blade for an oscillating tool.

As illustrated in FIG. 1, the blade 100 has a substantially rectilinear shape. In a non-limiting example, the width of the blade 100 can be from about 0.5 inches to about 4 inches, or more particularly, about 1.5 inches. A length of the blade 100 can be from about 2 inches to about 10 inches, or more particularly, about 5 inches. The cutting zone 106 can have a first thickness that is thinner than at least one of a thickness of the reinforcement 108 or a thickness of another region of the blade 100 beyond the reinforcement 108. In an example, the cutting zone 106 can have a thickness of about 0.05 inches or less for a blade formed of stainless steel. Portions of the blade 100 proximate to the attachment portion may be rounded, beveled, or cut away for advantageous handling and attachment of the blade 100 to an oscillating tool.

The blade 100 can be made using, for example, stainless steel, tungsten carbide, brass, cobalt, or any other suitable materials. In an embodiment, the cutting teeth of the cutting edge may include at least one different material, such as diamond, or carbide. In an embodiment, the blade 100 is made using a first material than is different from a second material used to make the reinforcement 108. For example, the blade 100 can be made using stainless steel, and the reinforcement can be made using iron, plastics, carbon fiber, rubber, etc., or combinations thereof.

FIG. 2 depicts a plan view of another embodiment of a straight cutting oscillating blade 200 having an attachment portion 202, a blade portion 204, a cutting zone 206 and a reinforcement 208. In this embodiment, the blade 200 further includes a cutout region 210 located between the attachment portion 202 and the reinforcement 208 such that the reinforcement 208 is located between the cutting zone 206 and the cutout region 210. The cutout region 210 is configured to reduce the mass of the blade 200 and to lessen vibration of an oscillating tool driving the blade 200.

As illustrated in FIG. 2, the cutout region 210 has a first side 212 that is substantially parallel to the reinforcement 208 and a second side 214 that is substantially perpendicular to the first side 212. However, in other embodiments, cutout regions with other shapes are also contemplated. In an example, a cutout region is defined by at least one curved or beveled side. In another example, a first radius connects the first side 212 to the straight cutting oscillating blade 200, and a second radius connects the second side 214 to the straight cutting oscillating blade 200. The cutout region 210 may be formed with other elements of the blade 200, such as in a common stamping operation.

Figure 3:
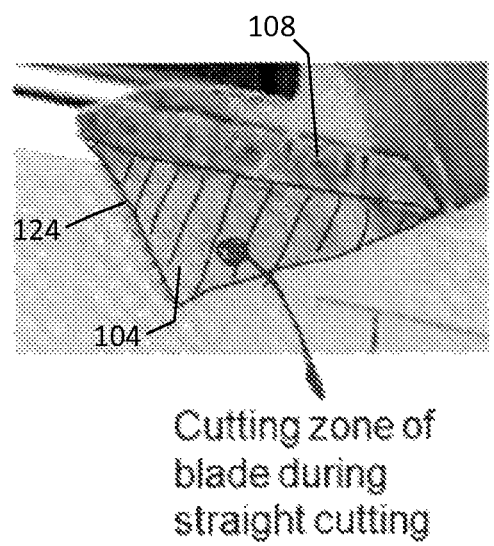
FIG. 3 is a perspective image of a cutting zone of an exemplary embodiment of a straight cutting oscillating blade.

FIG. 3 depicts an exemplary image of a blade that demonstrates a cutting zone for a straight cut with a straight cutting oscillating blade.

Figure 4:
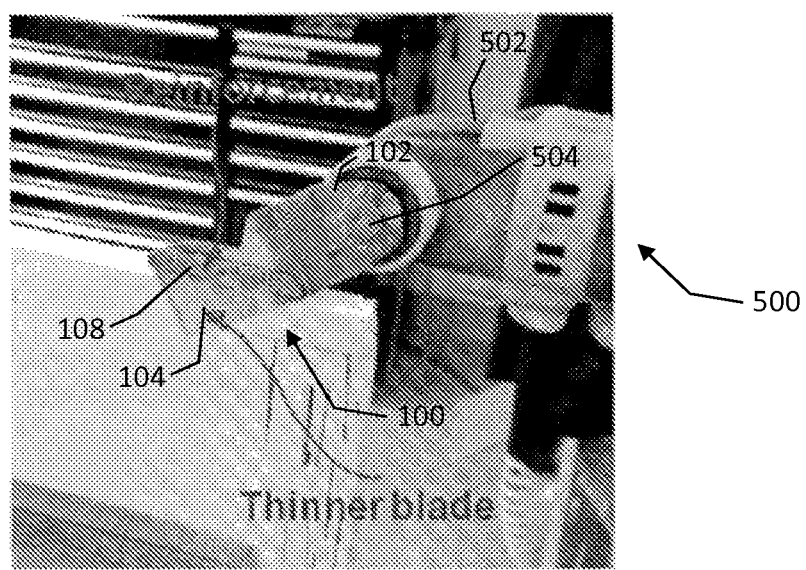
FIG. 4 is a perspective image of an exemplary embodiment of an oscillating tool with a straight cutting oscillating blade mounted thereon.
Figure 5:
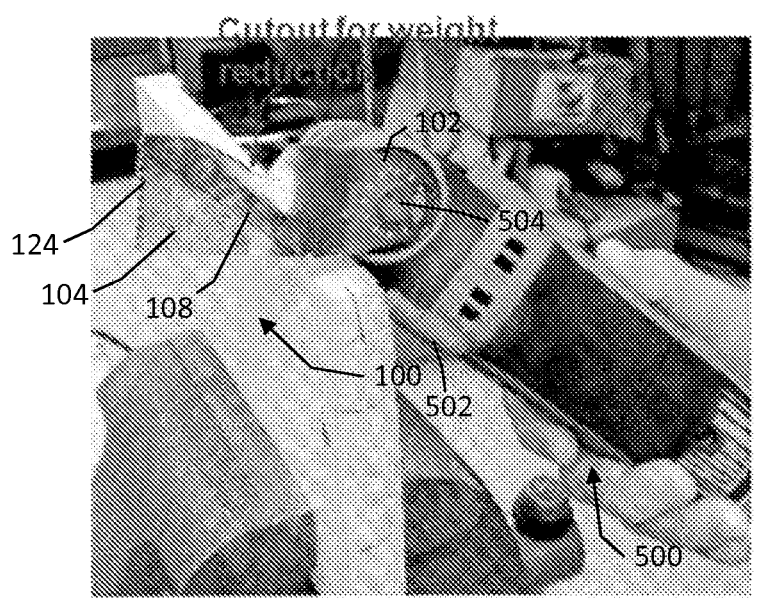
FIG. 5 is a perspective image of another exemplary embodiment of an oscillating tool with a straight cutting oscillating blade mounted thereon.

FIGS. 4-5 depict images of exemplary embodiments of oscillating tools with a straight cutting oscillating blade mounted thereon in conjunction with a workpiece upon which a straight cut has been performed using the oscillating tool. As can be seen in FIGS. 4 and 5, the oscillating tool 500 includes a portable housing 502. A motor (not visible) is enclosed within the housing 502. The motor is configured to oscillate a tool holder 504 that is located exterior to the housing. The tool holder 504 includes an accessory tool attachment interface that is configured to releasably retain accessory tools, such as the blade 100. The attachment portion 102 of the blade 100 includes an accessory attachment interface that is configured to mate with the tool attachment interface of the tool holder.

Figure 6:
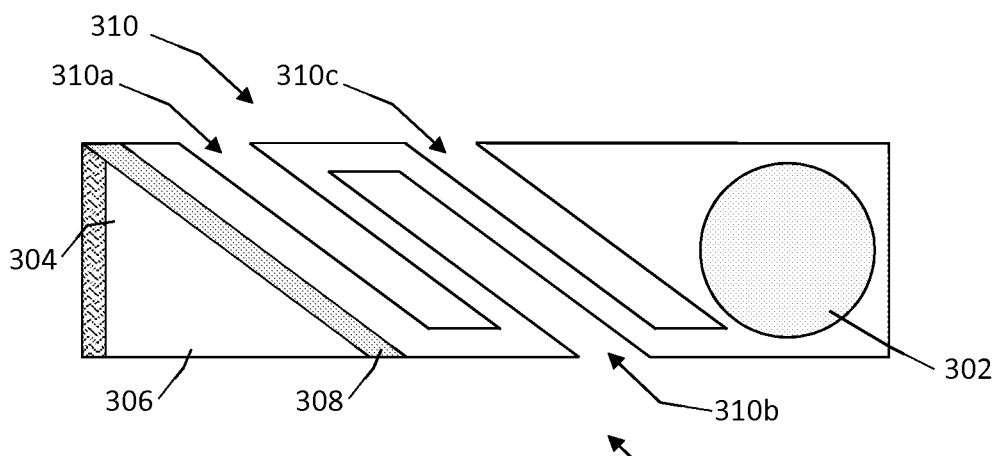
FIG. 6 is a plan view of another exemplary embodiment of a straight cutting oscillating blade.

FIG. 6 depicts a schematic diagram view of another embodiment of a straight cutting oscillating blade 300 having an attachment portion 302, a cutting end 304, a cutting zone 306 and a reinforcement 308. The blade 300 further includes three cutout regions 310a, 310b, 310c located beyond the reinforcement 308 such that the reinforcement 308 is located between the cutting zone 306 and the cutout region 310a, 310b, or 310c. The cutout regions 310a, 310b, 310c form at least a portion of the blade 300 into a serpentine shaped region 310 that is configured to reduce the mass of the blade 300 and to lessen vibration of an oscillating tool driving the blade 300. As described previously, cutout regions with other shapes are also contemplated.

Figure 7:
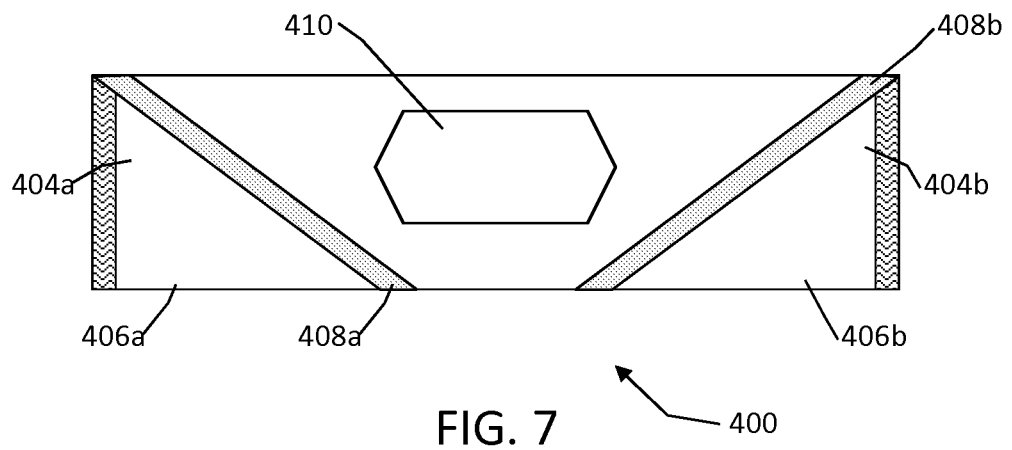
FIG. 7 is a plan view of another exemplary embodiment of a straight cutting oscillating blade.
Figure 8:
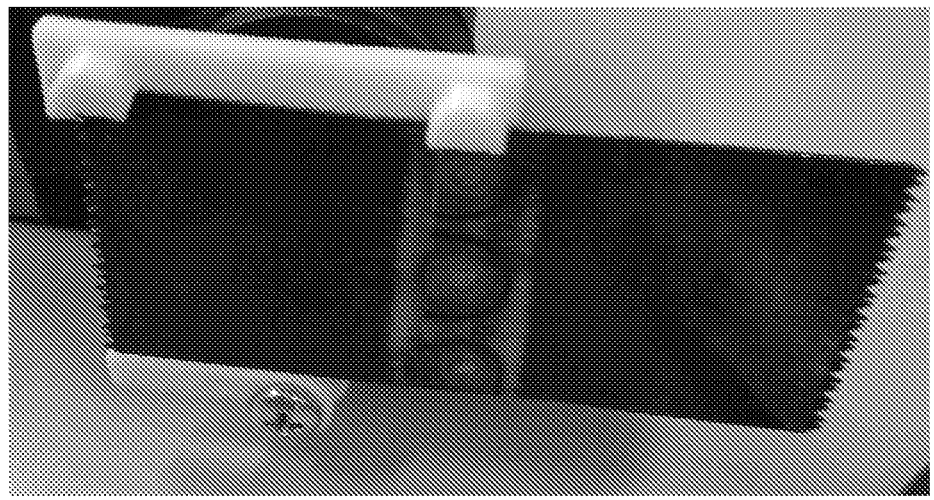
FIG. 8 is a perspective image of an exemplary embodiment of a blade attachment system for mounting an oscillating blade that does not include a mounting interface.

FIG. 7 depicts a schematic diagram view of another embodiment of a straight cutting oscillating blade 400. Unlike the previous embodiments, the blade 400 is not provided with an oscillating interface for mounting the blade 400 to an oscillating tool. Examples of blade attachment systems usable to secure the blade 400 to an oscillating tool include, but are not limited to, those disclosed, for example, in the commonly owned U.S. Patent Application No. 62/012,564, entitled "Blade And Blade Guard Attachment System For An Oscillating Tool", filed Jun. 16, 2014 by Rubens, the entirety of which is incorporated by reference in its entirety. An exemplary image of a blade attachment system for an oscillating blade that does not include an interface for mounting the blade to an oscillating tool is illustrated in FIG. 8.

Returning to FIG. 7, the blade 400 includes two cutting ends 404a, 404b on opposite end portions of the blade, two reinforcements 408a, 408b, and two cutting zones 406a, 406b formed between the cutting ends 404a, 404b and the reinforcements 408a, 408b, respectively. The extra cutting end 404b can be used, for example, as additional or replacement cutting end when the other cutting end 404a is worn out or damaged, such as after strenuous use or after some period of time. The blade 400 does not require the attachment portion found in blade 100, 200, and 300; as the second end of the blade is now used as the additional cutting end 404b.

The blade 400 further includes a cutout region 410 located between the reinforcement 408a, 408b. The cutout region 410 is configured to reduce a mass of the blade 400 and lessen vibration of an oscillating tool driving the blade 400. The cutout region 410 can be in any form or shape. More than one cutout region 410 is also contemplated.

In one aspect of the present disclosure, a straight blade for straight cutting with an oscillating tool is contemplated that comprises a cutting end that includes cutting teeth, a cutting zone configured to engage the cutting teeth during a straight cut, a reinforcement that extends across the straight blade at an angle relative to the cutting end, and an attachment portion configured to attach the straight blade to an oscillating tool.

In one aspect, the cutting zone of a straight cutting oscillating blade is defined by a substantially triangular shape.

In one further aspect, a reinforcement extends from a corner of the cutting end of the blade to a point along a side of the straight blade.

In a further aspect, the reinforcement is a member attached to the straight blade.

In an additional aspect, the reinforcement is defined by geometry of the straight blade.

In an embodiment, the straight blade further comprises a cutout region located such that the reinforcement is between the cutout region and the cutting zone.

In a further aspect, a first side of the cutout region is substantially parallel to the reinforcement.

In an additional embodiment, a second side of the cutout region is substantially perpendicular to the reinforcement.

In a further embodiment, the cutout region is defined by at least one smooth curve.

In an additional embodiment, the cutout region is configured such that the blade includes a serpentine region.

In another aspect, the cutting zone is defined by a thin profile.

In another embodiment, the reinforcement comprises a first material, and at least one of the cutting teeth and cutting zone comprise a second material different than the first material.

In a further embodiment, a straight blade for straight cutting with an oscillating tool comprises, at each end, a respective cutting end that includes cutting teeth, a cutting zone configured to engage the cutting teeth during a straight cut, and a reinforcement that extends across the straight blade at an angle relative to the cutting end. The straight blade further includes at least one cutout region located between the respective cutting ends.

In a further aspect, such a straight blade does not include a mounting region.

In yet another embodiment, an oscillating tool comprises a mounting zone, and a straight blade mounted on the mounting zone. The straight blade is configured for straight cutting, and comprises a cutting end with cutting teeth, a cutting zone configured to engage the cutting teeth during straight cutting, a reinforcement at an angle relative to the cutting end, and an attachment portion configured to be attached to the mounting zone.

In an additional embodiment, an oscillating tool comprises a mounting zone for mounting a straight blade thereon without requiring engagement with a mounting region of the straight blade. A straight is mounted in the mounting zone, is configured for straight cutting, and comprises, at opposite ends, a respective cutting end with cutting teeth, a respective cutting zone configured to engage the cutting teeth during straight cutting, and a respective reinforcement at an angle to the respective cutting end.

It will be appreciated that variants of the above-described and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the disclosure.

What is claimed is:

1. An accessory tool for an oscillating power tool, comprising:
    an attachment portion configured to mate with an oscillating drive member of a power tool;
    a blade portion including a first lateral edge portion, a second lateral edge portion, and a leading edge, the leading edge defining a cutting edge;
    a reinforcement structure extending across the blade portion from a first position located on the leading edge proximate the first lateral edge portion to a second position located on the second lateral edge portion and spaced apart from the leading edge,
    wherein the reinforcement structure defines a cutting zone that encompasses a leading edge portion of the blade portion between the reinforcement structure and the leading edge, the reinforcement structure being configured to increase a stiffness of the blade portion, and
    wherein the cutting zone is less thick than the reinforcement structure.

2. The accessory tool of claim 1, further comprising a transition portion that offsets the blade portion from the attachment portion.

3. The accessory tool of claim 2, wherein the second position on the second lateral edge portion is located proximate the transition portion.

4. The accessory tool of claim 1, wherein the cutting zone has a triangular shape defined by the leading edge, the second lateral edge portion, and the reinforcement structure.

5. The accessory tool of claim 1, wherein the cutting zone has a thickness 0.05 inches or less.

6. The accessory tool of claim 1, wherein the reinforcement structure comprises a strip of material attached to the blade portion.

7. The accessory tool of claim 6, wherein the reinforcement structure is formed of a different material than a material used to form the blade portion.

8. The accessory tool of claim 1, wherein the reinforcement structure is integral with the blade portion.

9. The accessory tool of claim 1, wherein a cutout region is defined in the first lateral edge portion of the blade portion on an opposite side of the reinforcement structure from the cutting zone.

10. The accessory tool of claim 9, wherein the cutout region has a curved shape.

11. The accessory tool of claim 9, wherein the cutout region has a serpentine shape.

12. An oscillating power tool comprising:
    a portable housing;
    a motor enclosed within the housing;
    a tool holder extending from the housing and configured to be oscillated by the motor about an oscillation axis; and
    an accessory tool including:
        a mounting portion configured to be releasably retained by the tool holder;
        a blade portion including a first lateral edge portion, a second lateral edge portion, and a leading edge, the leading edge defining a cutting edge; and
        a reinforcement structure extending linearly across the blade portion from a first position located on the leading edge proximate the first lateral edge portion to a second position located on the second lateral edge portion and spaced apart from the leading edge,
        wherein the reinforcement structure defines a cutting zone that encompasses a leading edge portion of the blade portion between the reinforcement structure and the leading edge, the reinforcement structure being configured to increase a stiffness of the blade portion, and
        wherein the cutting zone is less thick than the reinforcement structure.

13. The oscillating power tool of claim 12, wherein the accessory tool further comprises a transition portion that offsets the blade portion from the mounting portion.

14. The oscillating power tool of claim 13, wherein the second position on the second lateral edge portion is located proximate the transition portion.

15. The oscillating power tool of claim 12, wherein the cutting zone has a thickness 0.05 inches or less.

16. The oscillating power tool of claim 12, wherein the reinforcement structure comprises a strip of material attached to the blade portion.

17. The oscillating power tool of claim 16, wherein the reinforcement structure is formed of a different material than a material used to form the blade portion.

18. The oscillating power tool of claim 12, wherein a cutout region is defined in the first lateral edge portion of the blade portion on an opposite side of the reinforcement structure from the cutting zone.

* * * * *